US012562111B2

(12) United States Patent
Lin

(10) Patent No.: US 12,562,111 B2
(45) Date of Patent: Feb. 24, 2026

(54) DRIVING CIRCUIT AND PIXEL ELEMENT

(71) Applicant: VisionChip Technology Ltd., Hsinchu County (TW)

(72) Inventor: Cheng-Hung Lin, Hsinchu County (TW)

(73) Assignee: VisionChip Technology Ltd., Hsinchu County (TW)

( * ) Notice: Subject to any disclaimer, the term of this patent is extended or adjusted under 35 U.S.C. 154(b) by 154 days.

(21) Appl. No.: 18/410,964

(22) Filed: Jan. 11, 2024

(65) Prior Publication Data

US 2024/0355278 A1 Oct. 24, 2024

Related U.S. Application Data

(60) Provisional application No. 63/460,901, filed on Apr. 21, 2023.

(51) Int. Cl.
*G09G 3/32* (2016.01)
*G09G 3/3233* (2016.01)

(52) U.S. Cl.
CPC ............. *G09G 3/3233* (2013.01); *G09G 3/32* (2013.01); *G09G 2300/0857* (2013.01); *G09G 2330/021* (2013.01)

(58) Field of Classification Search
CPC ................... G09G 3/3233; G09G 3/32; G09G 2300/0857; G09G 2330/021
See application file for complete search history.

(56) References Cited

U.S. PATENT DOCUMENTS

| | | | | |
|---|---|---|---|---|
| 9,336,716 | B2 * | 5/2016 | Shin | G09G 3/3233 |
| 2016/0225314 | A1 * | 8/2016 | Lee | G09G 3/3233 |
| 2019/0114987 | A1 * | 4/2019 | Li | G09G 3/3233 |

* cited by examiner

*Primary Examiner* — Pegeman Karimi
(74) *Attorney, Agent, or Firm* — Winston Hsu

(57) ABSTRACT

A pixel element includes an emissive pixel element; and a driving circuit, coupled to the emissive pixel element, comprising: a memory circuit; a current source circuit; and a modulation circuit, coupled to the memory circuit, the current source circuit and the emissive pixel element, configured to control the current source circuit to inject a modulation current into the emissive pixel element according to modulation signals received from the memory circuit.

10 Claims, 11 Drawing Sheets

Truth Table

| PWM1 | PWM0 | I_LED |
|---|---|---|
| 0 | 0 | OFF |
| 0 | 1 | I1 |
| 1 | 1 | I1 + I2 |
| 1 | 0 | I1 + I2 + I3 |

FIG. 9B

DRIVING CIRCUIT AND PIXEL ELEMENT

CROSS REFERENCE TO RELATED APPLICATIONS

This application claims the benefit of U.S. Provisional Application No. 63/460,901, filed on Apr. 21, 2023. The content of the application is incorporated herein by reference.

BACKGROUND OF THE INVENTION

1. Field of the Invention

The present invention relates to a driving circuit and a pixel element, and more particularly, to a driving circuit and a pixel element that utilizes fast reading and writing of a memory to perform a pulse width modulation.

2. Description of the Prior Art

Light-emitting diode (LED) displays and organic light-emitting diode (OLED) displays are two types of display technologies that use light-emitting diodes (LEDs) to create images. Please refer to FIG. 1, which illustrates a conventional structure of a pixel element 1 for an LED display or an OLED display. When the pixel element 1 is driven by a word line WL and a bit line BL, the word signal on the word line WL controls the bit signal on the bit line BL to be temporarily stored in a capacitor Cs through a transistor T2, and then converted into an operating current for driving an LED or an OLED D1 through a transistor T1. However, the leakage path of the capacitor Cs of the pixel element 1 (for example, the leakage of the junction of the transistor T1, or the leakage of the dielectric of the capacitor Cs) may change the operating current and further result in the inability to effectively control the luminance of the LED or the OLED D1. Therefore, how to effectively control the luminance of the LED or the OLED has become one of the goals of the industry.

SUMMARY OF THE INVENTION

Therefore, the purpose of the present invention is to provide a driving circuit and a pixel element to improve the drawback of the prior art.

The embodiment of the present invention discloses a driving circuit, for an emissive pixel element, comprising: a memory circuit; a current source circuit; and a modulation circuit, coupled to the memory circuit, the current source circuit and the emissive pixel element, configured to control the current source circuit to inject a modulation current into the emissive pixel element according to modulation signals received from the memory circuit.

The embodiment of the present invention discloses a pixel element, comprising: an emissive pixel element; and a driving circuit, coupled to the emissive pixel element, comprising: a memory circuit; a current source circuit; and a modulation circuit, coupled to the memory circuit, the current source circuit and the emissive pixel element, configured to control the current source circuit to inject a modulation current into the emissive pixel element according to modulation signals received from the memory circuit.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

FIG. 9B is a truth table of modulation signals in FIG. 9A according to the embodiment of the present invention.

DETAILED DESCRIPTION

Certain terms are used throughout the description and following claims to refer to particular components. As one skilled in the art will appreciate, hardware manufacturers may refer to a component by different names. This document does not intend to distinguish between components that differ in name but not function. In the following description and in the claims, the terms "include" and "comprise" are utilized in an open-ended fashion, and thus should be interpreted to mean "include, but not limited to". Also, the term "couple" is intended to mean either an indirect or direct electrical connection. Accordingly, if one device is coupled to another device, that connection may be through a direct electrical connection, or through an indirect electrical connection via other devices and connections.

Figure 2:
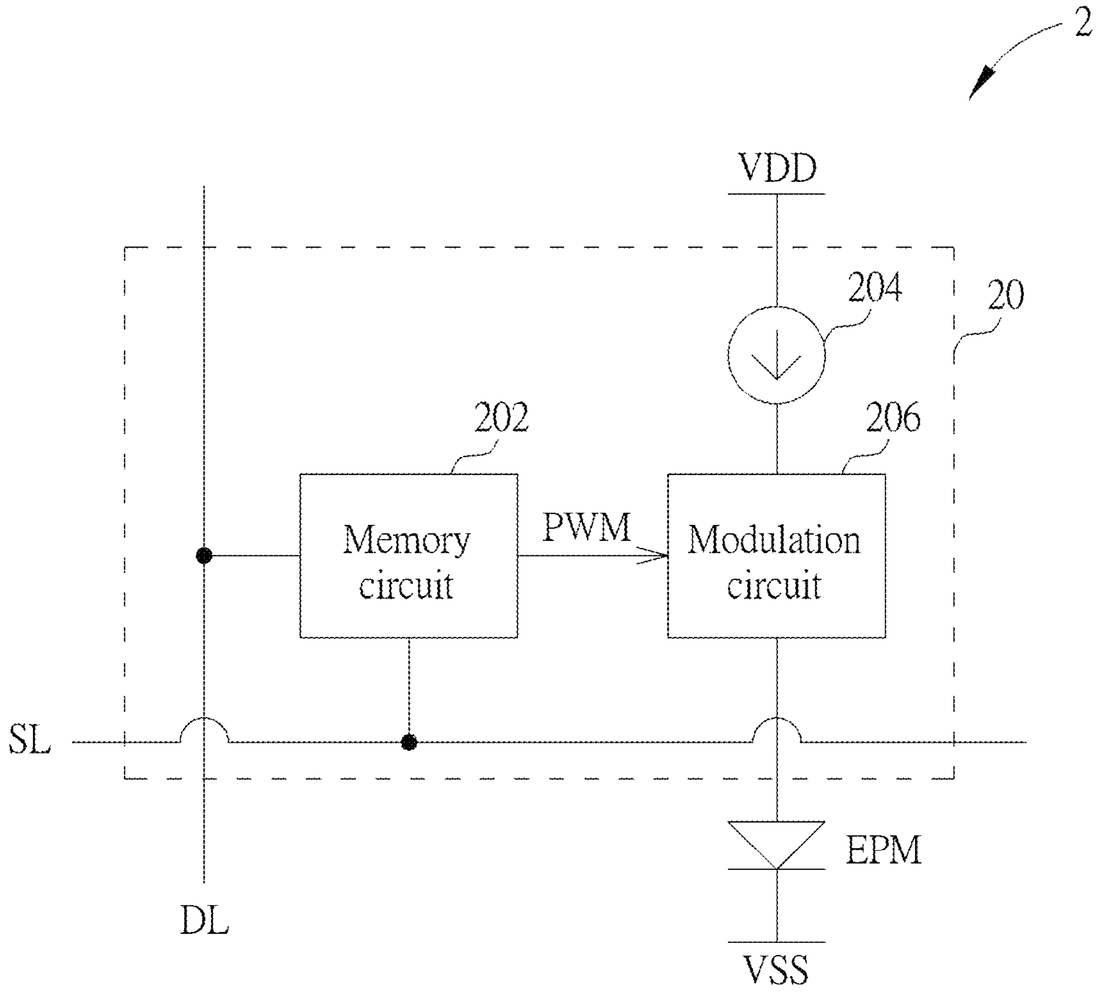
FIG. 2 is a schematic diagram of a pixel element according to an embodiment of the present invention.

Please refer to FIG. 2. FIG. 2 is a schematic diagram of a pixel element 2 according to an embodiment of the present invention. The pixel element 2 is utilized for a micro-display with light-emitting diode (LED) arrays or organic light-emitting diode (OLED) arrays. The pixel element 2 includes an emissive pixel element EPM and a driving circuit 20. The emissive pixel element EPM may be an LED or an OLED, but is not limited thereto. The driving circuit 20 is utilized to drive the emissive pixel element EPM to emit light, and includes a memory circuit 202, a current source circuit 204 and a modulation circuit 206. In detail, the modulation circuit 206 is coupled to the memory circuit 202, the current source circuit 206 and the emissive pixel element EPM, and configured to control the current source circuit 204 to inject a modulation current into the emissive pixel element EPM according to modulation signals PWM received from the memory circuit 202. It should be noted that, the memory circuit 202 receives signals through a word line WL and a bit line BL to generate the modulation signals PWM that are digital. Compared with the pixel element 1 of the conventional structure, the embodiment of the present invention avoids the impact of the leakage current of the capacitor Cs on the emissive pixel element EPM. The operation principle of the bit line BL and the word line WL should be well known in the art, so it is not repeated here.

Figure 1:
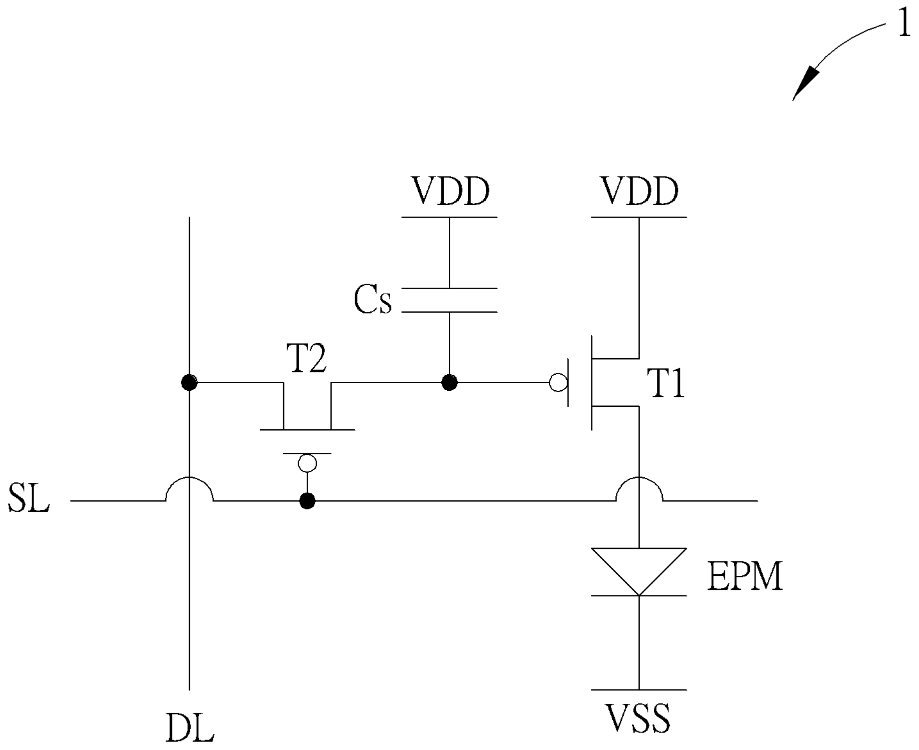
FIG. 1 is a schematic diagram of a pixel element with a conventional structure.

Furthermore, as shown in FIG. 1, the pixel element 1 of the conventional structure utilizes the capacitor Cs to store voltage to control the transistor T1 entering the saturation region to generate a driving current. Since the transistor T1 must be in the saturation region, the drain-source voltage Vds is greater than the gate-source voltage Vgs minus the threshold voltage Vt, which means that the drain-source voltage Vds of the transistor T1 is a large voltage, resulting in large power consumption. On the other hand, the pixel element 2 of the embodiment of the present invention utilizes the modulation circuit 206 to control the modulation current flowing from the current source circuit 204 into the emissive pixel element EPM. Since the current source circuit 204 is composed of one or multiple constant current sources, the drain-source voltage Vds of the current source circuit 204 may be controlled to the minimum voltage, which can improve the power consumption compared with the drain-source voltage Vds of the transistor T1 in FIG. 1.

Figure 3:
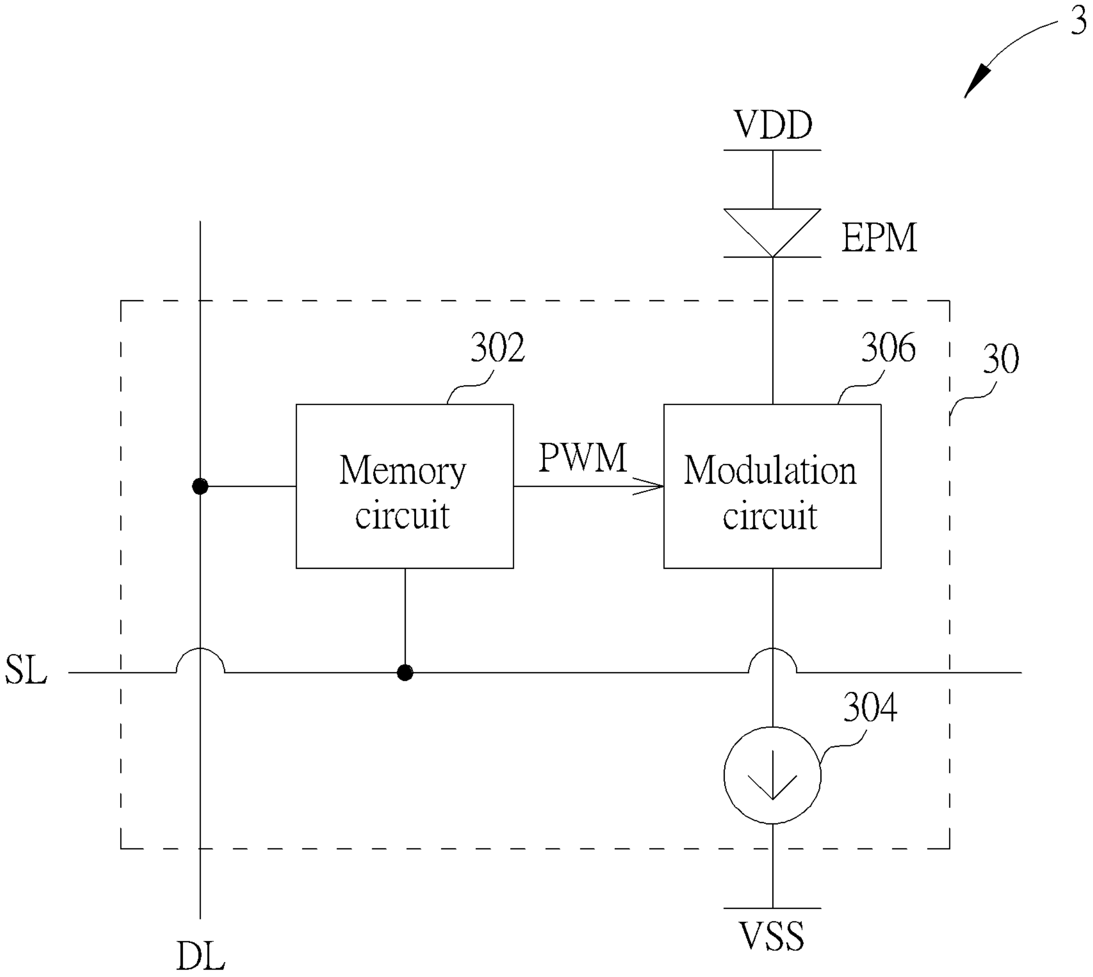
FIG. 3 is a schematic diagram of a pixel element according to another embodiment of the present invention.

Moreover, the pixel element of the embodiment of the present invention may be implemented in a common anode structure and a common cathode structure. For example, the pixel element 2 of FIG. 2 is the common cathode structure and a pixel element 3 of FIG. 3 is the common anode structure. As shown in FIG. 3, the driving circuit 30 is utilized to drive the emissive pixel element EPM to emit light, and includes a memory circuit 302, a current source circuit 304 and a modulation circuit 306. The difference of the operation principles between the anode structure and the cathode structure should be well known in the art, so it is not repeated here. For the sake of clarity, the following embodiments are all described using the common cathode structure.

Figure 4:
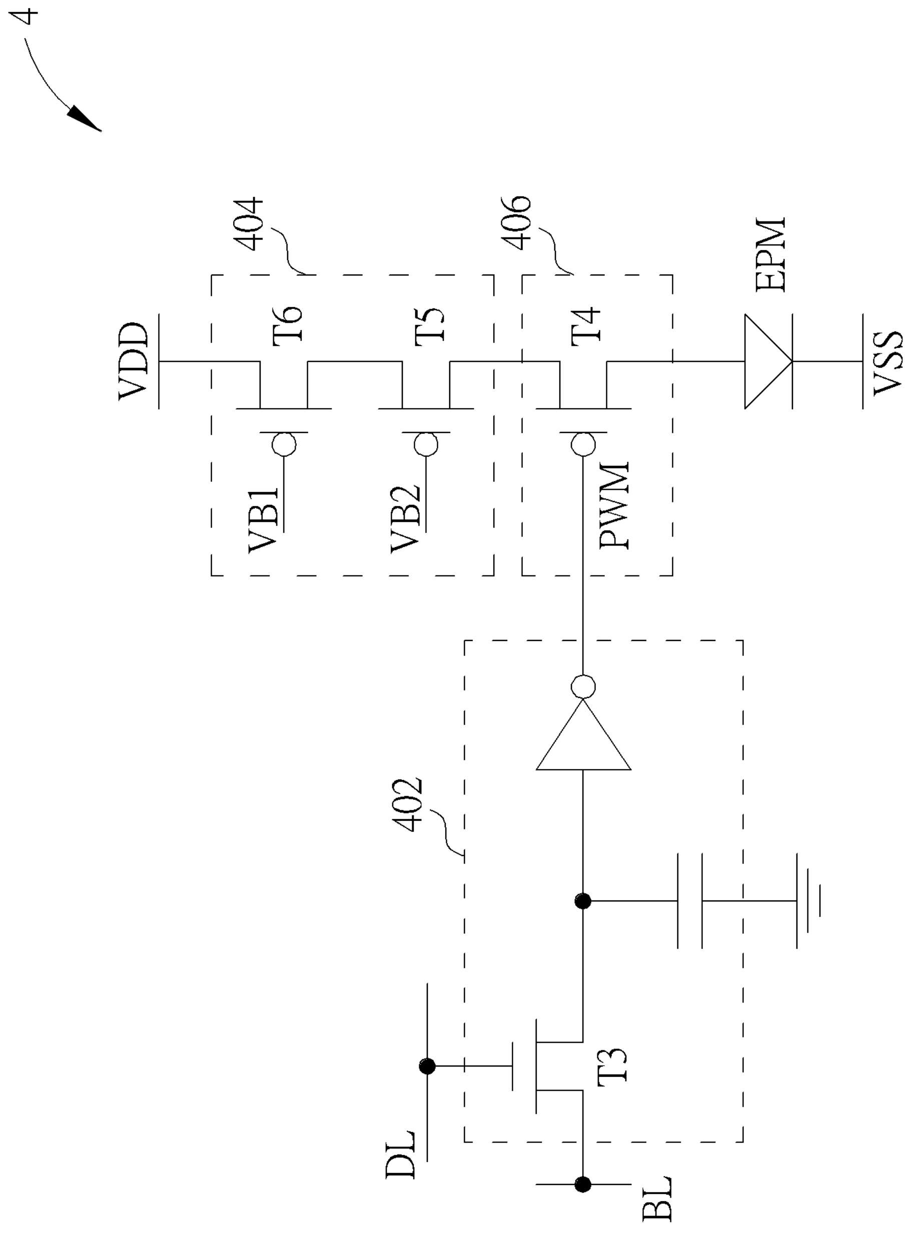
FIG. 4 is a schematic diagram of a pixel element according to another embodiment of the present invention.

It should be noted that FIG. 2 is an embodiment of the present invention, and those skilled in the art may make appropriate adjustments according to the system requirements. For example, the memory circuit 202 may be implemented by a dynamic random-access memory (DRAM) or a static random-access memory (SRAM). Please refer to FIG. 4. FIG. 4 is a schematic diagram of a pixel element 4 according to an embodiment of the present invention. The driving circuit of the pixel element 4 includes a DRAM 402 (composed of a transistor T3, a capacitor and an inverter), a current source circuit 404 (composed of transistors T5 and T6) and a modulation circuit 406 (T4). It should be noted that the DRAM 402 must regularly update the voltage on the capacitor to avoid the impact of leakage current on the capacitor. Furthermore, the DRAM 402, the current source circuit 404 and the modulation circuit only represent possible circuits, and those skilled in the art may make appropriate adjustments according to the system requirements. For example, bias voltages VB1 and VB2 may be provided by a current mirror circuit, but is not limited thereto.

Figure 5:
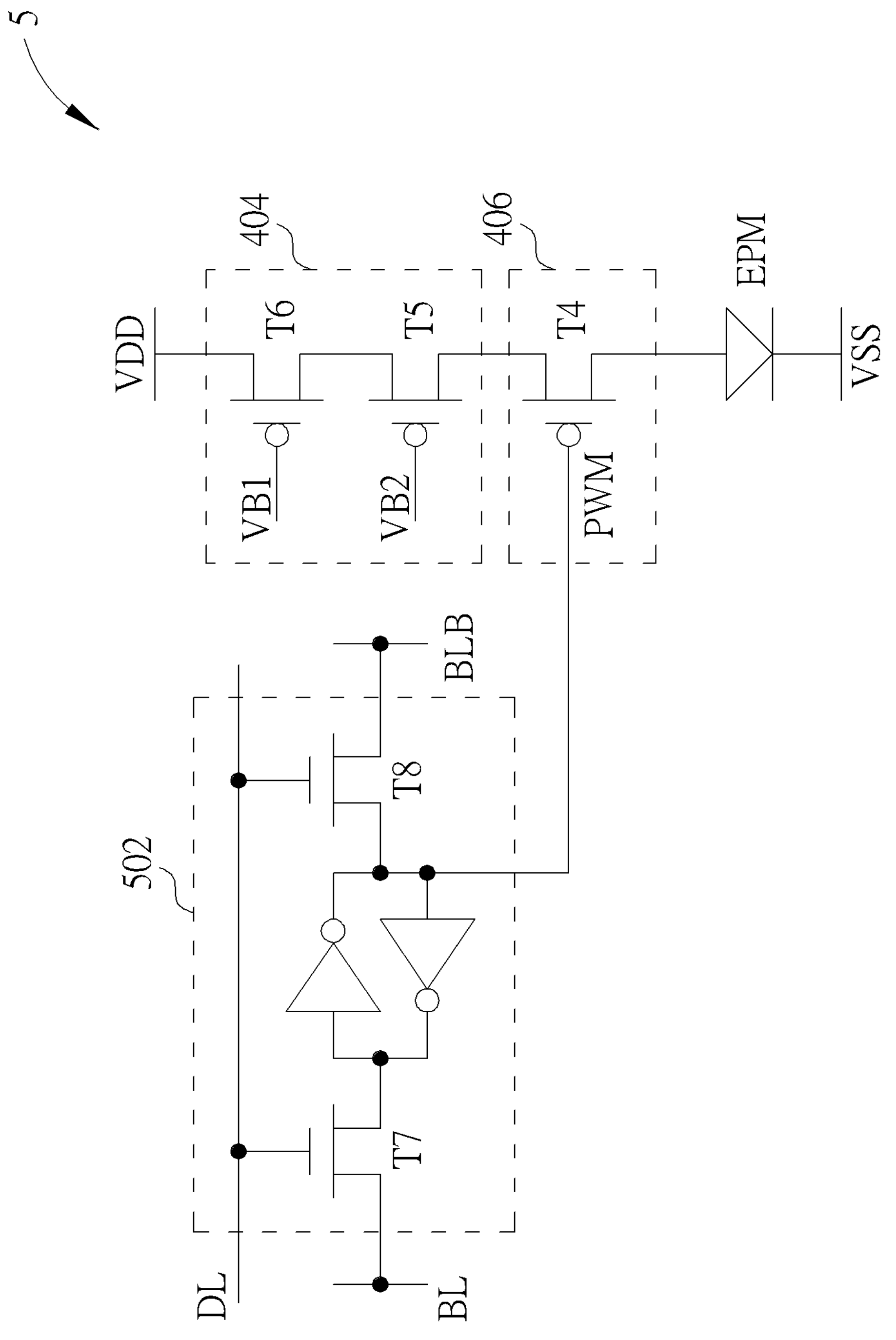
FIG. 5 is a schematic diagram of a pixel element according to another embodiment of the present invention.

On the other hand, FIG. 5 is a schematic diagram of a pixel element 5 according to an embodiment of the present invention. The difference between the pixel element 4 and the pixel element 5 is that the DRAM 402 is replaced by an SRAM 502 (composed of transistors T7, T8 and two inverters). The data stored in the SRAM 502 may be maintained permanently, so the SRAM 502 does not need to periodically update the voltage stored by the capacitor of the DRAM 402. In this way, the power consumption of the pixel element 5 may be less than the power consumption of the pixel element 4.

It should be noted that the DRAM 402 in FIG. 4 and the SRAM 502 in FIG. 5 only illustrate possible implementations of the memory circuit, and those skilled in the art may utilize any type of memory to implement the memory circuit, but is not limited thereto.

Figure 6A:
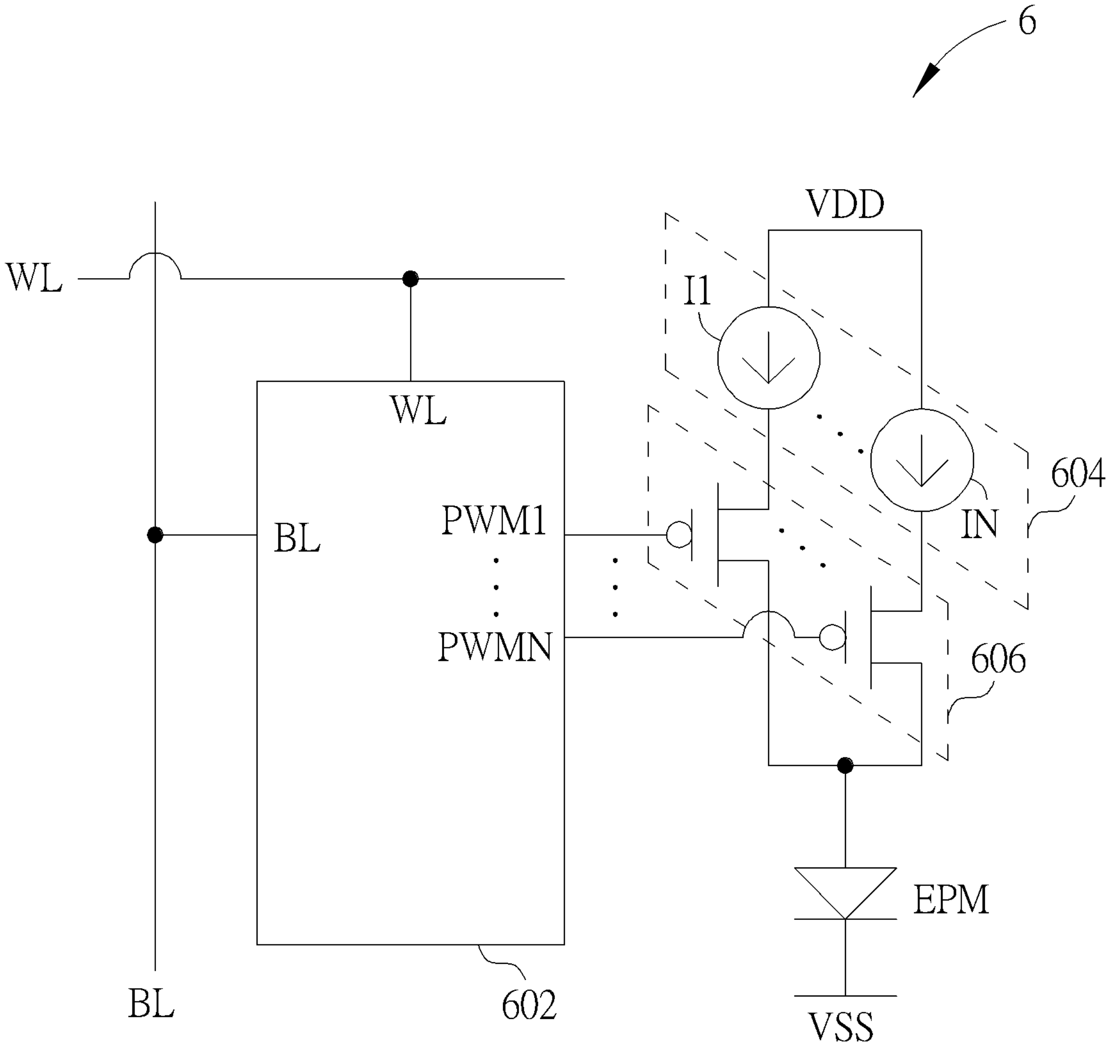
FIG. 6A is a schematic diagram of a pixel element according to another embodiment of the present invention.
Figure 6B:
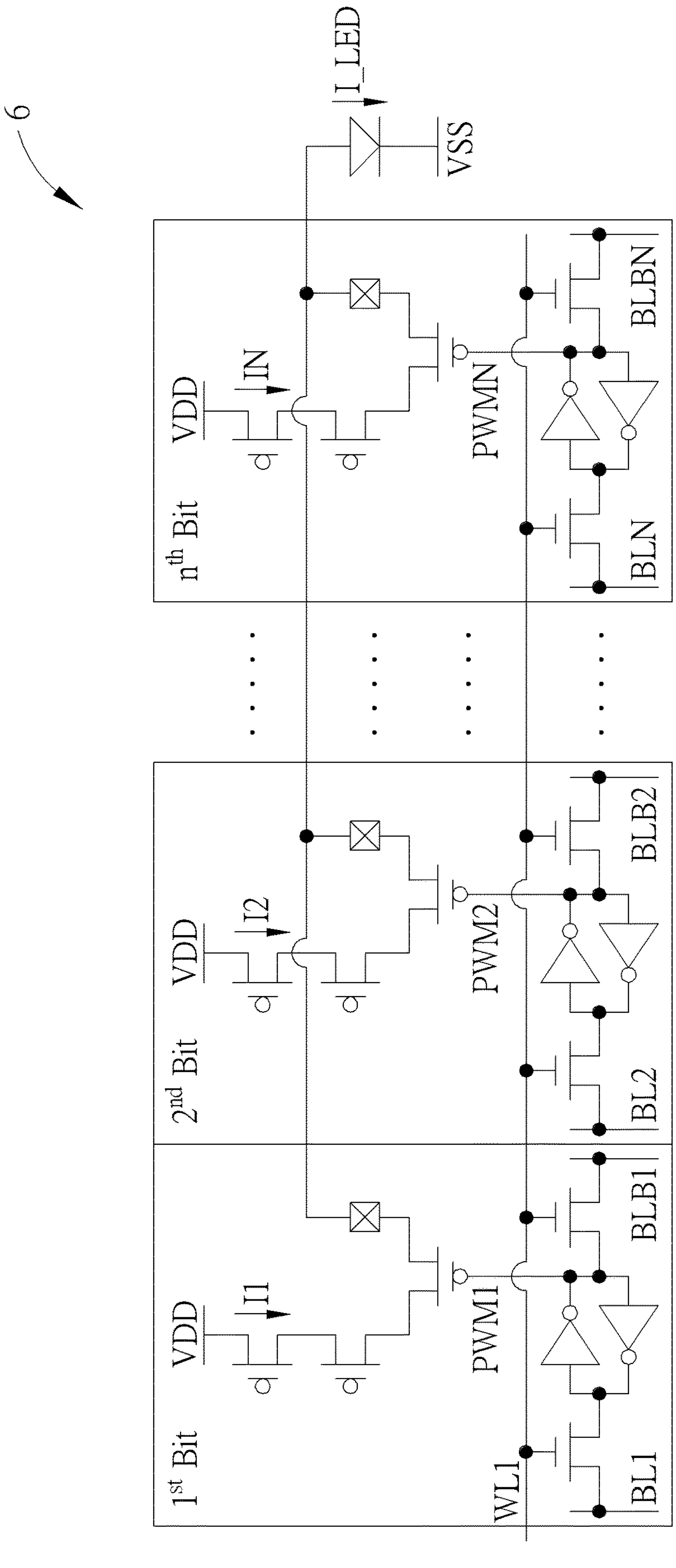
FIG. 6B is a detailed circuit diagram of the pixel element in FIG. 6A according to another embodiment of the present invention.
Figure 7:
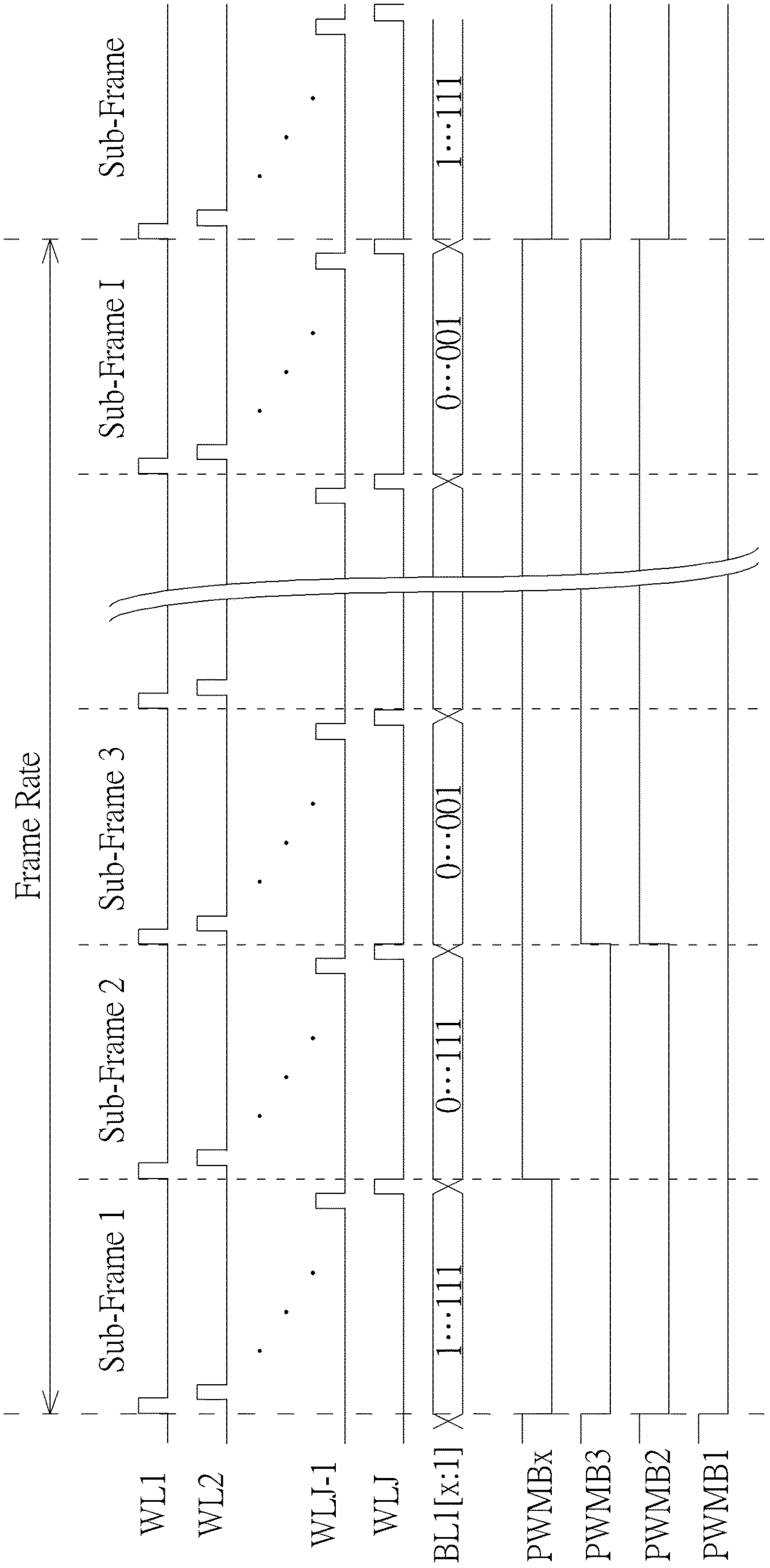
FIG. 7 is a timing diagram of the N modulation signals according to the embodiment of the present invention.

In order to perform pulse width modulation more efficiently, in another embodiment, the present invention may utilize an N-bit memory circuit to control the modulation circuit. For example, the N-bit memory circuit may receive an I-bit word signal and a J-bit bit signal, which means N=I*J. For the sake of clarity, the following embodiments do not consider the word line and the bit line, but assume that the memory circuit includes N bits. Please refer to FIG. 6A. FIG. 6A is a schematic diagram of a pixel element 6 according to an embodiment of the present invention. The pixel element 6 includes an N-bit memory circuit 602, a current source circuit 604, a modulation circuit 606 and the emissive pixel element EPM. In detail, N transistors of the modulation circuit 606 respectively receive N modulation signals PWM1-PWMN from the N-bit memory circuit 602 to control N constant current sources I1-IN of the current source circuit 604. In this way, one or more of the N constant current sources I1-IN may inject the modulation current into the emissive pixel element EPM according to the N modulation signals PWM1-PWMN. For example, as shown in FIG. 6B, each bit of the N-bit memory circuit 602 is implemented with the SRAM, each constant current source of the current source circuit 604 is implemented with two transistors of a cascade structure, and the modulation circuit 606 is implemented with N transistors (each transistor operates as a switch). To illustrate the operation of the pixel element 6, please refer to FIG. 7. FIG. 7 is a timing diagram of the N modulation signals PWM1-PWMN according to an embodiment of the present invention. The operation principle of the bit line BL and the word line WL should be well known in the art, so it is not repeated here. It should be noted that the modulation current I_LED flowing into the emissive pixel element EPM conforms to the following formula:

$$\text{I\_LED} = I1 * \frac{PWM1}{I} + I2 * \frac{PWM2}{I} + \ldots + IN * \frac{PWMN}{I}$$

$$f_{SRAM\_write} = \text{frame rate} * J * I$$

Where I_LED represents the modulation current, I1-IN represent the current values of the N constant current sources, PWM1-PWMN represent N modulation signals, I represents bit number of the word signals, and J represents bit number of the bit signals.

Figure 8:
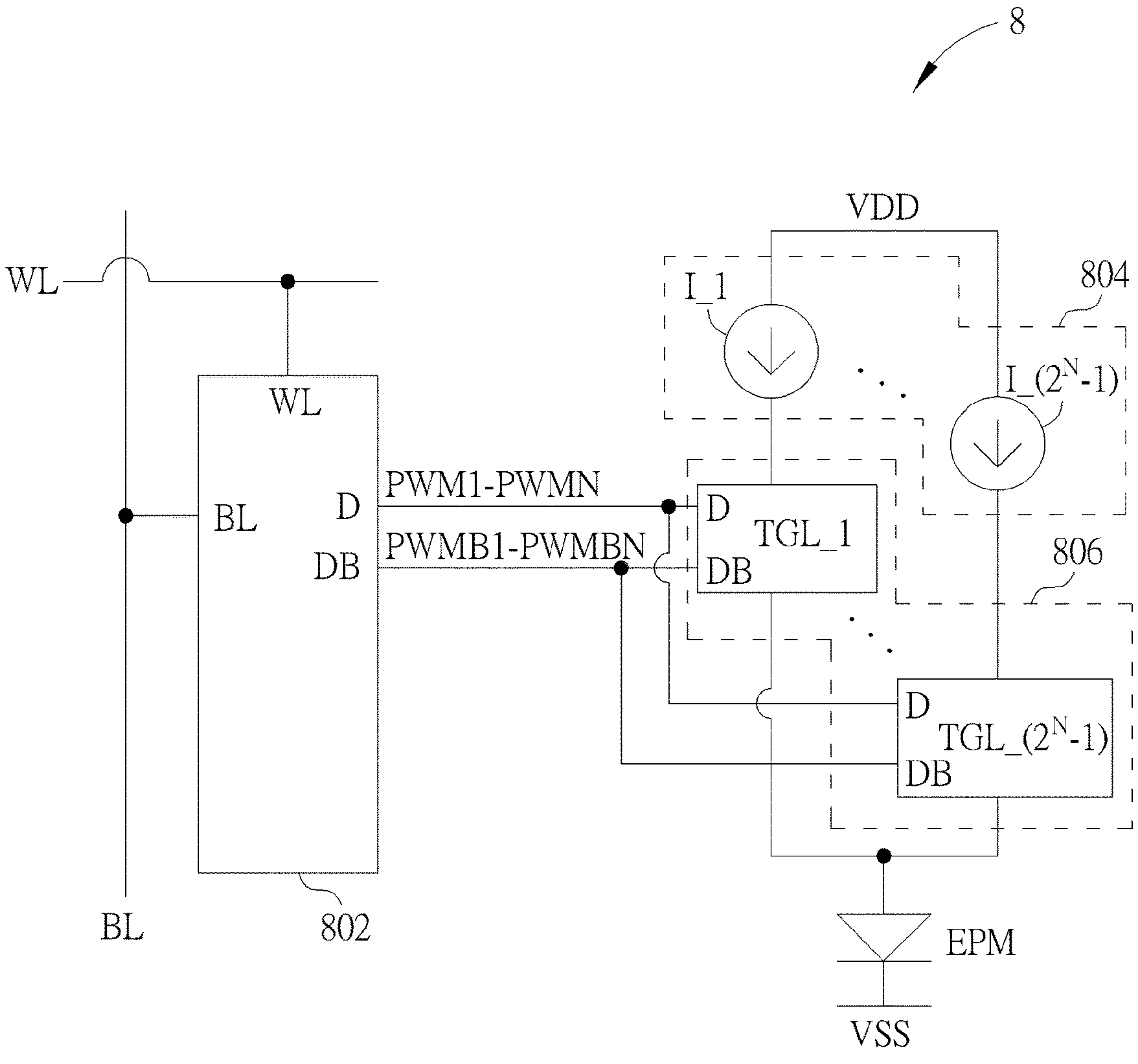
FIG. 8 is a schematic diagram of a pixel element according to another embodiment of the present invention.

Furthermore, in order to perform the pulse width modulation more efficiently, the modulation circuit of the present invention may be implemented as transmission gate logics (TGLs). Please refer to FIG. 8. FIG. 8 is a schematic diagram of a pixel element 8 according to an embodiment of the present invention. The pixel element 8 includes an N-bit memory circuit 802, a current source circuit 804, a modulation circuit 806 and the emissive pixel element EPM. In detail, $(2^N-1)$ TGLs of the modulation circuit 806 receive N modulation signals PWM1-PWMN from the N-bit memory circuit 602 to control $(2^N-1)$ constant current sources I_1-I_$(2^N-1)$ of the current source circuit 804. In this way, one or more of the $(2^N-1)$ constant current sources I_1-I_$(2^N-1)$ may inject the modulation current into the emissive pixel element EPM according to the N modulation signals PWM1-PWMN. In comparison, the memory circuit 602 of the pixel element 6 and the memory circuit 802 of the pixel element 8 are both N-bit SRAM. However, the memory circuit 802 combined with the transmission gate logics may control the $(2^N-1)$ constant current sources, and the memory circuit 602 combined with the transistors as switches may only control the N constant current sources. Specifically, when N is larger than 1, $(2^N-1)$ is larger than N, which means that N-bit SRAM combined with the transmission gate logics control more constant current sources than N-bit SRAM combined with switches. In other words, the pixel element 8 has better efficiency in performing the pulse width modulation.

Figure 9A:
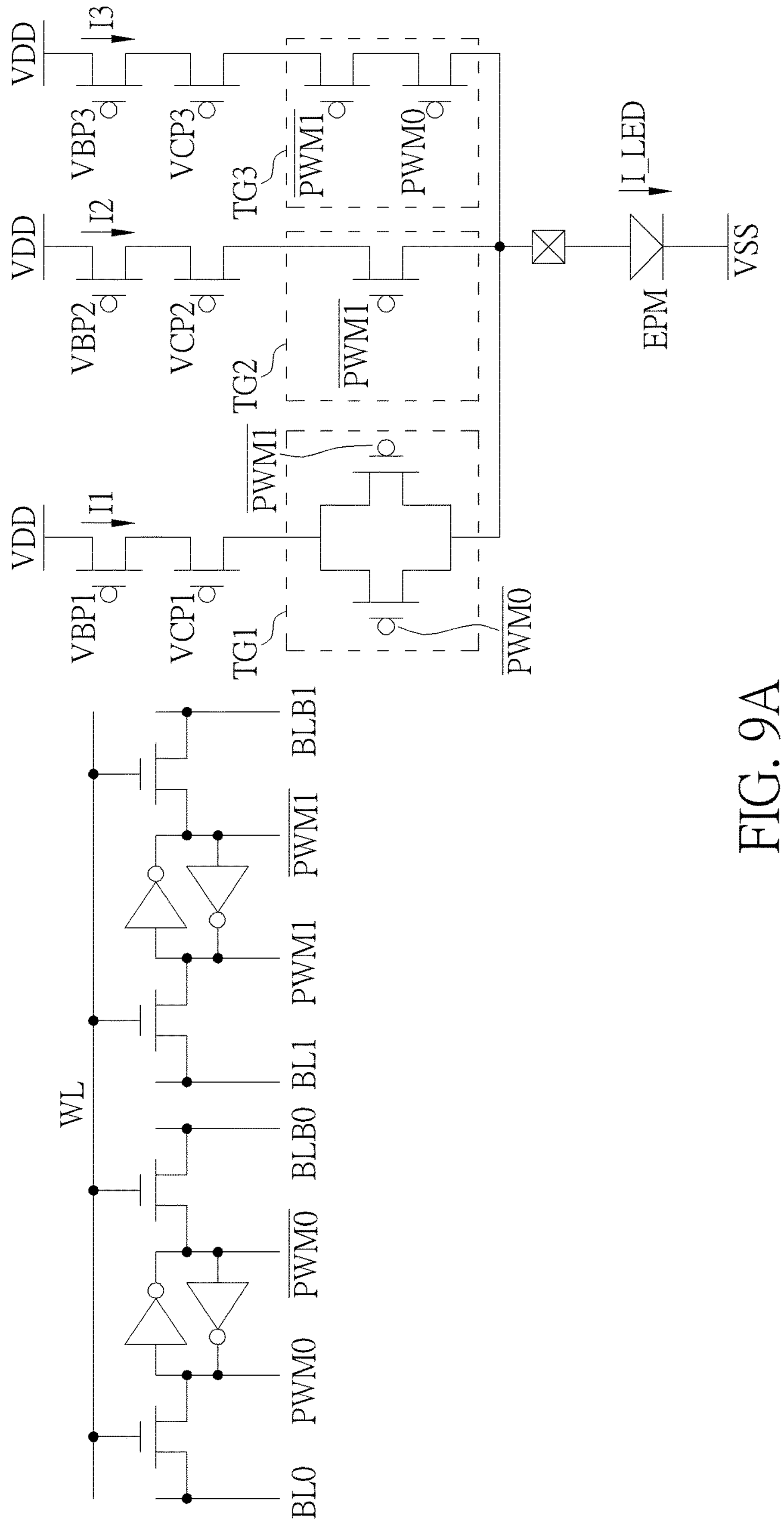
FIG. 9A is a schematic diagram of a pixel element 9 according to another embodiment of the present invention.

The pixel element 8 is described with N=2 as an example. Please refer to FIGS. 9A and 9B. FIG. 9A is a schematic diagram of a pixel element 9 according to an embodiment of the present invention. The pixel element 9 includes a 2-bit SRAM, 3 current source circuits providing constant currents I1-I3, the transmission gate logics TG1-TG3 and the emissive pixel element EPM. FIG. 9B is a truth table of modulation signals PWM0-PWM1 according to an embodiment of the present invention. In the embodiment, the transmission gate logics TG1-TG3 respectively control 3 current source circuits to inject current into the emissive pixel element EPM according to the modulations PWM0-PWM1. On the other hand, if the modulation circuit is implemented using transistors as switches, the 2-bit SRAM may only control 2 current sources through 2 switches. It should be noted that if the pixel element 6 and the pixel element 8 control the same number of constant current sources, the SRAM of the pixel element 8 requires fewer bits than the SRAM of the pixel element 6, which means that the pixel element 8 occupies less chip area.

It should be noted that the pixel elements 2-9 are different embodiments of the present invention, and those skilled in the art may make different modifications accordingly, which are not limited thereto. For example, the emissive pixel element includes LED and OLED, which is grown on low-temperature polycrystalline silicon (LTPS) glass, Polyimide (PI) flexible substrate or silicon-based substrate.

In summary, the pixel element of the present invention utilizes the memory circuit combined with the switches or the transmission gate logics to control constant current sources to drive the emissive pixel element to emit light. In this way, compared with the prior art, the pixel element of the present invention has better power consumption and occupies a smaller chip area.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A driving circuit, for an emissive pixel element, comprising:

a memory circuit;

a current source circuit; and a modulation circuit, coupled to the memory circuit, the current source circuit and the emissive pixel element, configured to control the current source circuit to inject a modulation current into the emissive pixel element according to modulation signals received from the memory circuit;

wherein the current source circuit comprises N constant current sources and the modulation circuit comprises N switches, wherein an M-th switch of the N switches is coupled to an M-th constant current source of the N constant current sources and controls the M-th constant current source to inject current into the emissive pixel element.

2. The driving circuit of claim 1, wherein the memory circuit is a dynamic random-access memory (DRAM).

3. The driving circuit of claim 1, wherein the memory circuit is an N-bit static random-access memory (SRAM), and the modulation signals from the memory circuit comprise N bits.

4. The driving circuit of claim 1, wherein the emissive pixel element is a light emitting diode (LED) or an organic light emitting diode (OLED).

5. A pixel element, comprising:

an emissive pixel element; and a driving circuit, coupled to the emissive pixel element, comprising:

a memory circuit;

a current source circuit; and a modulation circuit, coupled to the memory circuit, the current source circuit and the emissive pixel element, configured to control the current source circuit to inject a modulation current into the emissive pixel element according to modulation signals received from the memory circuit;

wherein the current source circuit comprises N constant current sources and the modulation circuit comprises N switches, wherein an M-th switch of the N switches is coupled to an M-th constant current source of the N constant current sources and controls the M-th constant current source to inject current into the emissive pixel element.

6. The pixel element of claim 5, wherein the memory circuit is a dynamic random-access memory (DRAM).

7. The pixel element of claim 5, wherein the memory circuit is an N-bit static random-access memory (SRAM), and the modulation signals from the memory circuit comprise N bits.

8. The pixel element of claim 5, wherein the emissive pixel element is a light emitting diode (LED) or an organic light emitting diode (OLED).

9. A driving circuit, for an emissive pixel element, comprising:

a memory circuit;

a current source circuit; and a modulation circuit, coupled to the memory circuit, the current source circuit and the emissive pixel element, configured to control the current source circuit to inject a modulation current into the emissive pixel element according to modulation signals received from the memory circuit;

wherein the current source circuit comprises (2N−1) constant current sources and the modulation circuit comprises (2N−1) transmission gate logics (TGLs), wherein an M-th switch of the (2N−1) switches is coupled to an M-th constant current source of the (2N−1) constant current sources and controls the M-th constant current source to inject current into the emissive pixel element responsive to the modulation signals.

10. A pixel element, comprising:

an emissive pixel element; and a driving circuit, coupled to the emissive pixel element, comprising:

a memory circuit;

a current source circuit; and a modulation circuit, coupled to the memory circuit, the current source circuit and the emissive pixel element, configured to control the current source circuit to inject a modulation current into the emissive pixel element according to modulation signals received from the memory circuit;

wherein the current source circuit comprises $(2^N-1)$ constant current sources and the modulation circuit comprises $(2^N-1)$ transmission gate logics (TGLs), wherein an M-th switch of the $(2^N-1)$ switches is coupled to an M-th constant current source of the $(2^N-1)$ constant current sources and controls the M-th constant current source to inject current into the emissive pixel element responsive to the modulation signals.

* * * * *